Oct. 10, 1933.    A. J. HAVLIS    1,929,584
BATH DEVICE FOR BIRD CAGES AND THE LIKE
Filed May 21, 1932
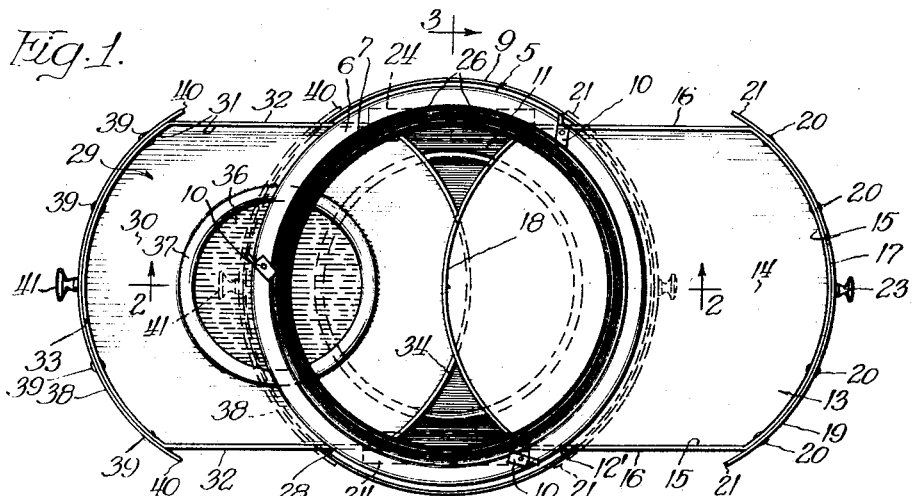
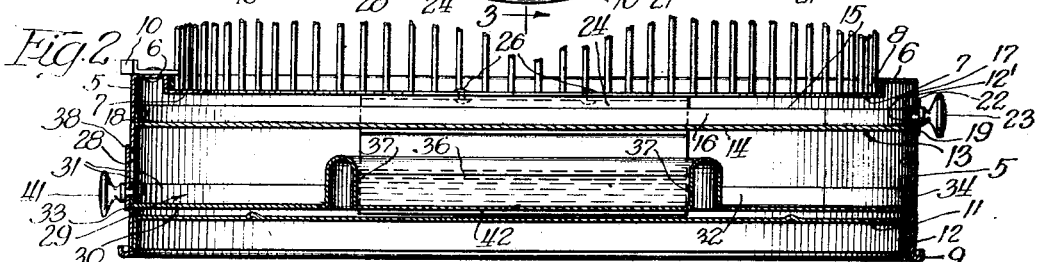
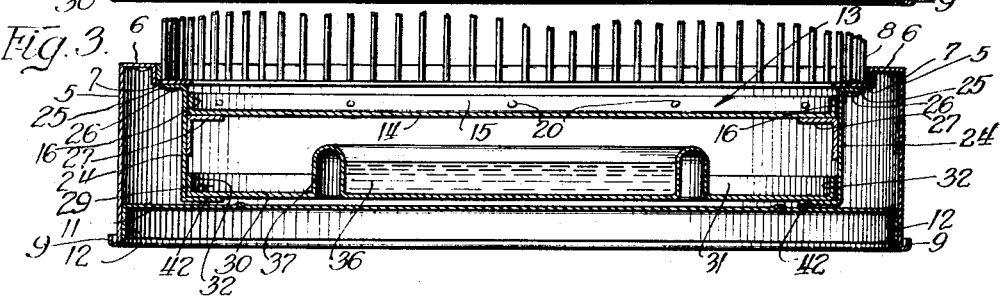
Inventor:
Adolph J. Havlis
By Brown, Jackson, Boettcher + Dienner
Attys.

Patented Oct. 10, 1933

1,929,584

UNITED STATES PATENT OFFICE 1,929,584

BATH DEVICE FOR BIRD CAGES AND THE LIKE

Adolph J. Havlis, Cicero, Ill., assignor to F. & H. Manufacturing Company, Chicago, Ill., a corporation of Illinois Application May 21, 1932. Serial No. 612,731

6 Claims. (Cl. 119—17)

This invention relates to bath devices for bird cages and the like, and contemplates an improved structure in which the bath device is removed and replaced by lateral sliding movement in the base of the cage.

It is well known that various forms of bath devices for bird cages and the like have been previously provided, and I am aware that it has been contemplated to provide a removable tray or drawer slidable in the base, a fixed floor in the base upon which the drawer is slidable, a central opening in the floor, and a bath device detachably connected to the bottom of the floor from beneath the cage to underlie the opening in the floor.

The objection to the structure above described is that in the use of the bath device, the floor, to the bottom of which the bath device is attached, is spattered with water and debris, and it is impossible to remove the same without removing the cage body from the base of the cage. Another objection is that attachment of the bath device to and removal from the bottom of the cage is difficult. Where the base of the cage is resting upon an object, it is necessary to lift the cage in order to apply such a bath device to the bottom of the cage, and where the cage is suspended from the top, it is usually necessary to bend down beneath the bottom of the cage to see that the bayonet slots in the bath device are slipped over the pins or projections on the bottom of the fixed floor of the cage, and unless the attachment of the bath device to the floor of the cage is tight, the bath device is apt to work loose and drop from place.

The present invention simplifies the removal and replacement of the bath device, and by forming or carrying this device on a tray slidable laterally in the base of the cage any spattering of water or debris in the use of the bath device will collect upon this tray and may be easily removed without separating the cage body from the base of the cage.

The feature of a bath device which is adapted to be removed and replaced by lateral sliding movement in the base of the cage is an important aspect of the present invention, as is the feature of forming or carrying this device on a laterally slidable tray which is adapted to completely underlie the cage body and is at the same time laterally removable and replaceable for facility in cleaning and placing the bath water in and removing it from the bath device.

In the drawing:

Figure 1 is a top plan view of a cage base embodying the present invention showing, in full lines, the top drawer etxending out laterally to one side of the cage, and the tray with the bath device extended out to the opposite side;

Figure 2 is a vertical section taken on the line 2—2 of Figure 1;

Figure 3 is a vertical section taken on the line 3—3 of Figure 1.

The cage base shown is of generally circular shape and comprises the generally cylindrical side wall 5, the upper margin of which is turned in at 6. The inturned margin 6 is stepped or offset downwardly at 7, to form an annular depressed support for the bottom of the cage body 8, which may be of any suitable openwork form of wires or bars as well known in the art.

The base is preferably formed of sheet metal, and the lower edge may be rolled at 9. The cage body 8 may be releasably connected to the base of the cage by fasteners 10 pivoted upon the inturned margin 6, or the cage body may be releasably connected to the cage base in any other suitable or preferred manner. Fitting snugly within the cage base is the fixed floor or bottom member 11, the margin of which is turned down at 12 and soldered or otherwise suitably fastened to the inner surface of the side wall 5.

The side wall 5 is provided on one side of the base with a suitable arcuate slot or opening 12', preferably of less length than the diameter of the base through which opening an upper drawer or tray 13 is slidable. The drawer 13, which has a flat bottom wall 14 is completely bounded by an upstanding flange 15, and is shaped to conform generally to the shape of the cage. The particular drawer shown has parallel sides 16, 16, and the front and back are rounded at 17 and 18, respectively. The drawer 13 when in closed position completely underlies the cage body 8 since the diameter of the opening defined by the down-stepped rim 7 is the same as, or preferably slightly less than the distance between the parallel sides 16, 16, and the length of the bottom wall 14 between the rounded front and back rims 17, 18 is such as to dispose these rims beneath the rim 6 of the base. When the drawer is closed it forms a removable bottom for the cage upon which the seed husks, debris, and other accumulations will collect and may be removed by merely removing the drawer 13 laterally from the base. Upon removing and cleaning this drawer, it may be replaced by inserting it into the opening 12' and sliding it back into place and the cage is thus cleaned without removing the body 8 from the cage base.

An arcuate front strip 19 is riveted at 20, or otherwise suitably attached to the front rim 17 of the drawer 13. The ends of this strip preferably extend at 21 beyond the ends of the front rim 17, and its width is preferably slightly greater at 22 than the height of the rim 17, so that when the drawer 13 is closed the projecting edges of the strip 19 overlap the edges of the wall 5 along the opening 12', and effectively close and conceal the same. The curvature of the strip 19 conforms generally with the curvature of the side wall 5, and this strip 19 may be finished to correspond with the finish on the outer surface of the wall 5. A suitable knob or handle 23 is secured to the drawer front whereby said drawer may be readily manipulated.

For the purpose of supporting the drawer 13 within the base, a pair of hanger members 24, 24 are provided, one along each of the opposite parallel sides 16, 16. These hangers 24 are turned out at their upper ends at 25, and these out-turned ends 25 are fastened by rivets 26, soldering or otherwise to the down-stepped margins 7 of the base. The flat depending sides of the hangers 24 are parallel and spaced to receive relatively snugly the flat sides of the drawer 13 to guide the drawer in its sliding movement in the base. Brackets or ledge members 27 formed on or fastened to the hangers 24 form rests upon which the bottom of the drawer 13 is slidable.

At the side opposite the opening 12 and beneath the drawer or tray 13, the wall 5 has a second arcuate slot or opening 28, also preferably of less length than the diameter of the base through which a lower tray 29 is slidable. The tray 29 which has a bottom wall 30 is completely bounded by an upstanding flange 31, and is also shaped to conform generally to the shape of the cage. It has parallel sides 32, 32 and the front and back are rounded at 33 and 34, respectively. Like the drawer 13, the tray 29 when in closed position completely underlies the cage body 8 since, as in the case of the drawer 13, the diameter of the opening defined by the down-stepped rim 7 is the same as, or preferably slightly less than the distance between the parallel sides 32, and the length of the bottom wall 30 between the rounded front and back rims 33 and 34 is such as to dispose these rims beneath the rim 6 of the base when the tray 29 is in place. When the upper drawer 13 is removed with the tray 29 in place, this tray forms a removable bottom for the cage upon which spattering of water, as will presently appear, seed husks, debris and other accumulations will collect and may be removed by merely removing the tray 29 laterally from the base where it may be conveniently cleaned and replaced by inserting it into the opening 28 and sliding it back into position.

The tray 29 has a bath device 36 formed on or suitably carried thereby. In the illustrated embodiment, the bath device 36 is formed at substantially the center of the tray 29 by forming an annular upstanding wall 37 in the bottom 30 of the tray. The wall 37 may be produced by forming a fold in the bottom 30, or otherwise as desired, and its height is sufficient to form a well or receptacle of the desired depth to contain a suitable supply of bath water for the bird. It is to be understood, of course, that the bath device instead of being formed in the tray 29 may be made up separately and mounted on or in the tray as suitable or desired.

An arcuate front strip 38 is riveted at 39, or otherwise suitably secured to the front rim of the tray 29. The ends of the strip 38 preferably extend at 40 beyond the ends of the front rim, and its width is preferably slightly greater than the height of the front rim of the tray 29, so that when this tray is in position in the cage base, these projecting edges of the strip 38 will overlap the edges of the wall 5 along the opening 28, and close and conceal this opening. The curvature of the strip 38 conforms generally with the curvature of the wall 5, and this strip 38 may be finished to correspond with the finish on the outer surface of the cage base. A suitable knob or handle 41 is secured to the front of the tray 29 whereby said tray may be readily manipulated.

To support the tray 29 within the cage base and preferably slightly above the fixed bottom 11, the lower ends of the hangers 24 are turned in at 42 to form rests upon which the bottom of the tray 29 is slidable. The flat sides 32 fit relatively snugly between the parallel depending sides of the hangers 24 to guide the tray 29 in its sliding movement in the cage base.

When the cage is in use the drawer 13 is preferably in place and forms a false bottom beneath the cage body 8. When it is desired to provide the bird with bathing facilities, the tray 29 is withdrawn laterally. The desired amount of bath water is placed in the receptacle 36, and the tray 29 is then replaced. Then by removing the drawer 13 the tray 29 forms the bottom of the cage and the bath device on this tray is rendered accessible to the bird within the cage. Any spattering of water or debris at this time collects upon the tray 29, which may be conveniently cleaned by removing the tray laterally from the base and cleaning and replacing it. Then, assuming that the bath is completed, the drawer 13 is replaced in the position shown in Figure 2.

It will be apparent from the foregoing that the bath device is laterally removable from and replaceable in the base of the cage without reaching down beneath the fixed bottom of the cage, and without making attachment at that position. It will also be apparent that the entire part which underlies the cage body 8 when the bath device is in use, is removable laterally for cleaning and without removing the body of the cage from the cage base. At the same time the cage base is formed not only to receive and guide the upper drawer laterally into and out of place, but is also formed to receive and guide laterally into and out of place the lower tray carrying the bath device.

I claim:

1. In combination a cage body, a base for said body, a tray slidable laterally in said base to underlie said body, a second tray slidable laterally in said base beneath said first tray, and a bath device on said second tray.

2. In combination, a cage body, a base for said body, a removable tray slidable laterally in said base to underlie said body, a second tray slidable laterally in said base beneath said first tray to underlie said cage body upon removal of said first tray, and means within said base for supporting and guiding said trays in their sliding movement in the base, said means comprising a pair of parallel spaced hangers attached to an inturned flange at the top of the base and vertically spaced supports on said hangers for the upper and lower trays.

3. In combination, a cage body, a base for said body, a removable tray slidable in said base to underlie said body, a second tray slidable in said base beneath said first tray to underlie said cage body upon removal of said first tray, means within said base for supporting and guiding said trays in their sliding movement in the base, said means comprising a pair of parallel spaced hangers attached to an inturned flange at the top of the base, vertically spaced supports on said hangers for the upper and lower trays, and a bottom attached to the base beneath the trays and beneath said hangers.

4. In combination, a cage body, a base for said cage body, said base having a pair of side openings, a tray slidable laterally in said base through one of said openings, a second tray slidable laterally in the base through the other opening and in a plane beneath the plane of movement of said first tray, and a bath device on said second tray.

5. In combination, a cage body, a base for said cage body, said base having a side wall provided with a pair of openings, a pair of horizontally aligned tray supports at opposite sides of one of said openings, a tray slidable laterally through one of said openings and upon said horizontally aligned tray supports, a second pair of horizontally aligned tray supports at opposite sides of the other opening, a second tray slidable laterally through said other opening and upon said second tray supports in a plane beneath the plane of movement of said first tray, and a bath device on said second tray.

6. In combination, a cage body, a base for said cage body, a pair of trays disposed in superposed relation in said base beneath said cage body and each removable from said base by lateral sliding movement in said base, and a bath device on one of said trays, said bath device being accessible from within the cage body when the tray with the bath device is presented to the interior of said cage body and being covered by the other tray when said other tray is in position in the base above the tray with the bath device.

ADOLPH J. HAVLIS.